United States Patent
Chi

(10) Patent No.: US 9,859,740 B2
(45) Date of Patent: Jan. 2, 2018

(54) ADAPTER, PORTABLE ELECTRONIC DEVICE AND CHARGE CONTROL METHOD THEREOF

(71) Applicant: uPI Semiconductor Corp., Hsinchu County (TW)

(72) Inventor: Li-Lun Chi, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 197 days.

(21) Appl. No.: 14/720,974

(22) Filed: May 26, 2015

(65) Prior Publication Data

US 2016/0105038 A1  Apr. 14, 2016

(30) Foreign Application Priority Data

Oct. 13, 2014 (TW) .............................. 103135372 A

(51) Int. Cl.
 H02J 7/00 (2006.01)
 H02J 7/14 (2006.01)

(52) U.S. Cl.
 CPC ............ *H02J 7/007* (2013.01); *H02J 7/0004* (2013.01); *H02J 7/0052* (2013.01); *H02J 2007/0062* (2013.01)

(58) Field of Classification Search
 USPC ....... 320/103, 107, 162, 101, 134, 109, 108, 320/112, 113, 114, 115, 132, 145, 160
 See application file for complete search history.

(56) References Cited

U.S. PATENT DOCUMENTS

| | | | | |
|---|---|---|---|---|
| 5,994,875 A | * | 11/1999 | Lee | H02J 7/0077 320/132 |
| 6,256,682 B1 | | 7/2001 | Gudan et al. | |
| 6,445,936 B1 | * | 9/2002 | Cannon | H02J 7/00 455/573 |
| 7,358,703 B2 | | 4/2008 | Veselic | |
| 7,868,873 B2 | | 1/2011 | Palay et al. | |
| 2007/0257642 A1 | * | 11/2007 | Xiao | H02J 7/0026 320/134 |
| 2008/0197804 A1 | * | 8/2008 | Onishi | H02J 7/025 320/108 |
| 2009/0322287 A1 | * | 12/2009 | Ozeki | H02J 7/0018 320/145 |
| 2010/0054313 A1 | | 3/2010 | Chu et al. | |
| 2010/0277131 A1 | * | 11/2010 | Kano | H02J 7/044 320/160 |

(Continued)

FOREIGN PATENT DOCUMENTS

CN 102299532 12/2011

*Primary Examiner* — Alexis Pacheco
(74) *Attorney, Agent, or Firm* — JCIPRNET

(57) ABSTRACT

An adapter, a portable electronic device and a charge control method thereof are provided. The adapter includes a connector and a controller. The connector includes a first terminal. The controller is electrically connected to the connector and determines whether to enter a quick charge mode according to a control signal from the connector. In the quick charge mod, the controller receives a charge control signal from the first terminal. The charge control signal has a plurality of pulses, and encoding information is formed by the plurality of pulses. The adapter is controlled by the controller according to the encoding information so as to provide a quick charge voltage.

23 Claims, 5 Drawing Sheets

(56) References Cited

U.S. PATENT DOCUMENTS

| | | | | |
|---|---|---|---|---|
| 2014/0043780 A1* | 2/2014 | Tsai | ............. | H05K 5/0026 |
| | | | | 361/752 |
| 2014/0117922 A1* | 5/2014 | Pham | ............. | H02J 7/0027 |
| | | | | 320/103 |
| 2014/0159660 A1* | 6/2014 | Klose | ............. | B60L 11/1838 |
| | | | | 320/109 |
| 2014/0265566 A1* | 9/2014 | Nguyen | ............. | H02J 7/0068 |
| | | | | 307/23 |
| 2015/0303727 A1* | 10/2015 | Jeong | ............. | H02J 7/0044 |
| | | | | 320/103 |
| 2017/0005499 A1* | 1/2017 | Zhang | ............. | H02J 7/0029 |

* cited by examiner

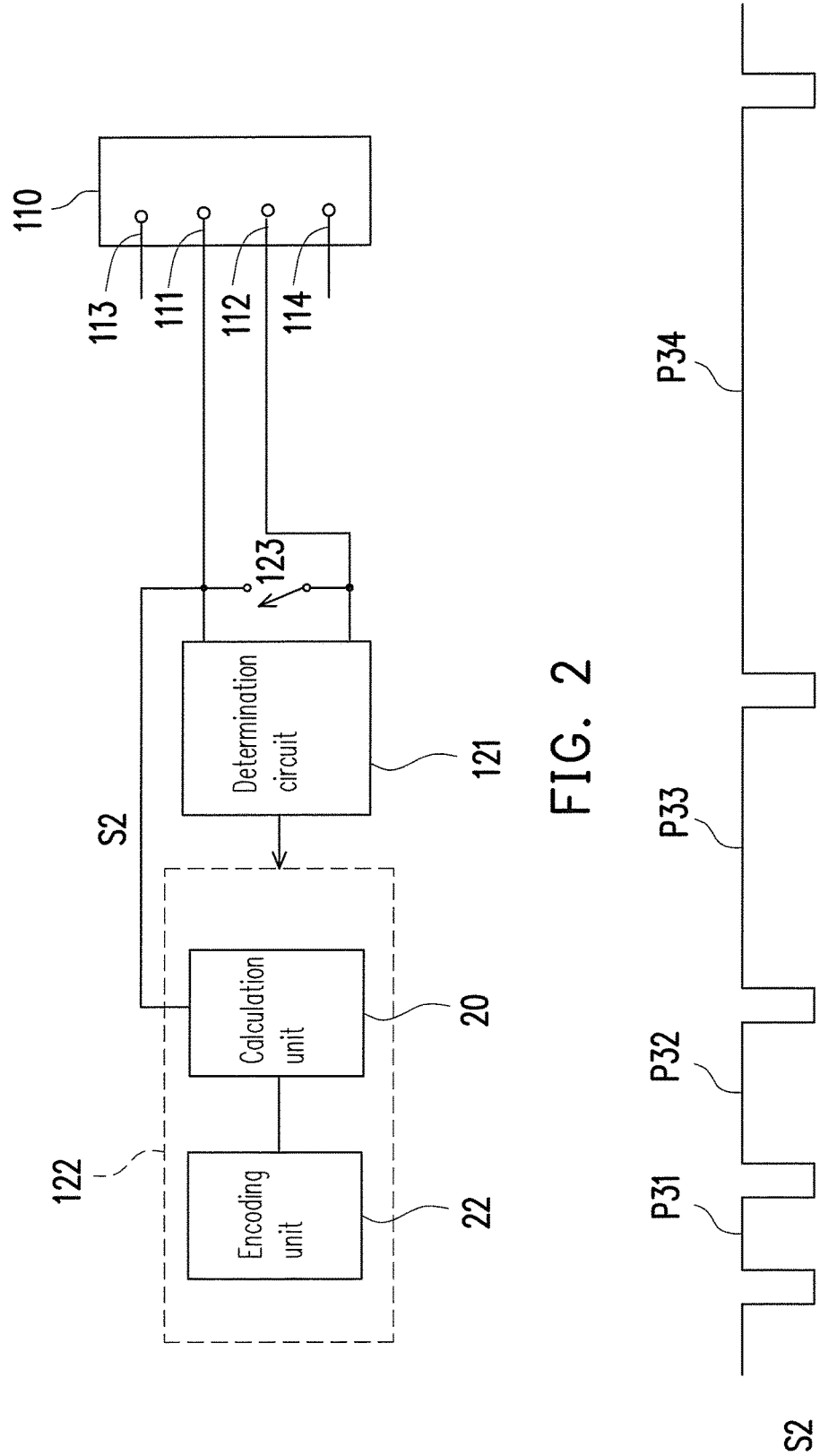

ADAPTER, PORTABLE ELECTRONIC DEVICE AND CHARGE CONTROL METHOD THEREOF

CROSS-REFERENCE TO RELATED APPLICATION

This application claims the priority benefit of Taiwan application serial no. 103135372, filed on Oct. 13, 2014. The entirety of the above-mentioned patent application is hereby incorporated by reference herein and made a part of this specification.

BACKGROUND

Technical Field

The invention relates to an electronic device and a control method thereof, and particularly relates to an adapter, a portable electronic device and a charge control method thereof.

Related Art

In recent years, various portable electronic devices are quickly developed, and functions thereof are developed towards a trend of diversified functions. Moreover, as a power is highly used, a charge demand of the portable electronic device is greatly increased. Generally, the power of the portable electronic device can be provided by an external power adapter or an internal battery pack. Moreover, in response to various charge demands, a charge control between the portable electronic device and the power adapter becomes complicated, which increases a design cost and design complexity of the portable electronic device and the power adapter.

SUMMARY

The invention is directed to an adapter, a portable electronic device and a charge control method thereof, by which a charge control signal transmitted through a single data line is used to achieve control of a quick charge voltage, which avails reducing design cost and design complexity of the adapter and the portable electronic device.

The invention provides an adapter including a connector and a controller. The connector includes a first terminal. The controller is electrically connected to the connector and determines whether to enter a quick charge mode according to a control signal from the connector. In the quick charge mode, the controller receives a charge control signal from the first terminal, wherein the charge control signal has a plurality of pulses, and encoding information is formed by the plurality of pulses. The controller controls the adapter according to the encoding information so as to provide a quick charge voltage.

According to another aspect, the invention provides a charge control method of an adapter, wherein the adapter comprises a connector, and the charge control method of the adapter includes following steps. It is determined whether to enter a quick charge mode according to a control signal from the connector. In the quick charge mode, a charge control signal from a first terminal of the connector is received, wherein the charge control signal has a plurality of pulses, and encoding information is formed by the plurality of pulses. The adapter is controlled according to the encoding information so as to provide a quick charge voltage.

The invention provides a portable electronic device including a connector and a charger. The connector includes a first terminal. The charger is electrically connected to the connector and transmits a control signal through the connector, so as to indicate whether to enter a quick charge mode. In the quick charge mode, the charger transmits a charge control signal including a plurality of pulses through the first terminal. Moreover, widths of the plurality of pulses have a proportional relationship, encoding information is generated according to the proportional relationship, and the encoding information is used for indicating a quick charge voltage.

According to another aspect, the invention provides a charge control method of a portable electronic device, wherein the portable electronic device comprises a connector, and the charge control method of the portable electronic device includes following steps. A control signal is transmitted through the connector, so as to indicate whether to enter a quick charge mode. In the quick charge mode, a charge control signal including a plurality of pulses is transmitted through a first terminal of the connector. Moreover, widths of the plurality of pulses have a proportional relationship, encoding information is generated according to the proportional relationship, and the encoding information is used for indicating a quick charge voltage.

According to the above descriptions, the portable electronic device of the invention can communicate with the adapter through the charge control signal transmitted through a single data line, so as to make the adapter to generate the corresponding quick charge voltage. In other words, the charge control signal transmitted through the single data line can be used to implement control of the quick charge voltage, which avails reducing design cost and design complexity of the adapter and the portable electronic device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a schematic diagram of a charge control circuit in an adapter according to an embodiment of the invention.

FIG. 3 is a schematic diagram of a charge control signal according to an embodiment of the invention.

DETAILED DESCRIPTION OF DISCLOSED EMBODIMENTS

In the following embodiments, when "A" device is referred to be "electrically connected" to "B" device, the "A" device can be directly connected or coupled to the "B" device, or other devices probably exist there between, or the two devices can communicated with each other through an electric signal. A term "circuit" or "unit" can represent at least one device or a plurality of devices or devices actively and/or passively coupled to each other to provide a suitable function. A term "signal" can represent at least one current, voltage, load, temperature, data or other signal.

Figure 1:
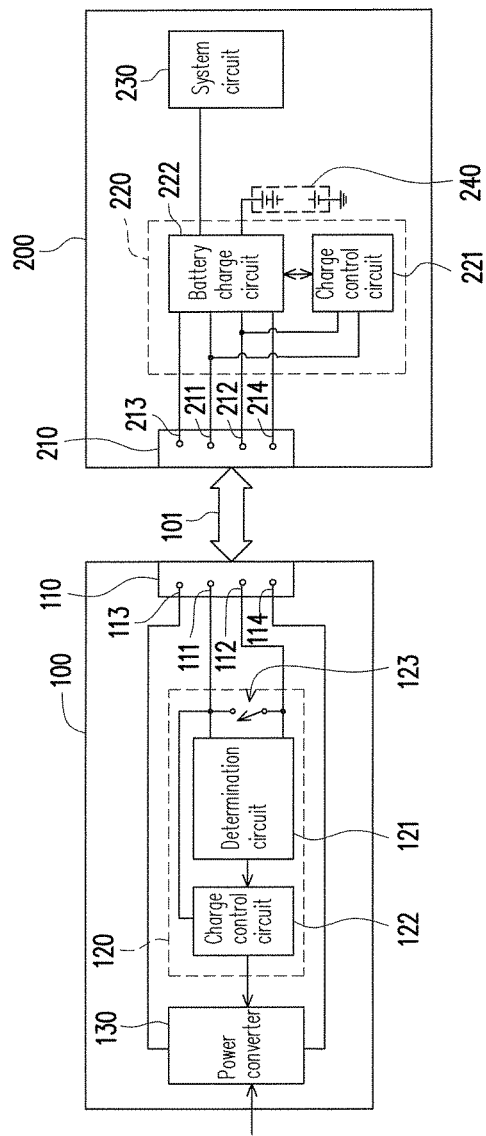
FIG. 1 is a schematic diagram of an adapter and a portable electronic device according to an embodiment of the invention.

FIG. 1 is a schematic diagram of an adapter and a portable electronic device according to an embodiment of the invention. Referring to FIG. 1, the portable electronic device 200 can be electrically connected to the adapter 100 through a connection interface 101, such that a voltage from the adapter 100 can be used to charge the portable electronic device 200 or supply a power required by a system circuit of the portable electronic device 200. Moreover, the adapter 100 is, for example, a power adapter, and the portable electronic device 200 is, for example, a smart phone, a personal digital assistant (PDA), a tablet personal computer (PC), or a notebook, etc.

The adapter 100 includes a connector 110, a controller 120 and a power converter 130. The connector 110 includes a first terminal 111, a second terminal 112, a power terminal 113 and a ground terminal 114. The controller 120 is electrically connected to the connector 110, and the power converter 130 is electrically connected to the controller 120 and the connector 110. Moreover, the controller 120 includes a determination circuit 121, a charge control circuit 122 and a switch 123. The determination circuit 121 is electrically connected to the first terminal 111 and the second terminal 112. The charge control circuit 122 is electrically connected to the first terminal 111, the determination circuit 121 and the power converter 130. The switch 123 is electrically connected between the first terminal 111 and the second terminal 112.

On the other hand, the portable electronic device 200 includes a connector 210, a charger 220, a system circuit 230 and a battery pack 240. The connector 210 includes a first terminal 211, a second terminal 212, a power terminal 213 and a ground terminal 214. The charger 220 is electrically connected to the connector 210, the system circuit 230 and the battery pack 240. Moreover, the charger 220 includes a charge control circuit 221 and a battery charge circuit 222. The charge control circuit 221 is electrically connected to the first terminal 221 and the second terminal 212. The battery charge circuit 222 is electrically connected to the connector 210, the system circuit 230 and the battery pack 240. Moreover, the battery pack 240, for example, includes a plurality of battery cells.

In an application, the connector 110 in the adapter 100 can be electrically connected to the connector 210 in the portable electronic device 200 through the connection interface 101. Besides, the first terminal 111, the second terminal 112, the power terminal 113 and the ground terminal 114 of the connector 110 are respectively connected to the first terminal 211, the second terminal 212, the power terminal 213 and the ground terminal 214 of the connector 210. In an embodiment of the invention, the terminals can be pins, but the invention is not limited thereto.

Moreover, in an embodiment, the connector 110 and the connector 210 can be respectively a universal serial bus (USB) connector, and the connection interface 101 can be a USB connection line. In other embodiments, the connector 110, the connector 210 and the connection interface 101 can also adopt other types of transmission connectors and communication medium thereof, but the invention is not limited thereto. Moreover, the first terminals 111 and 211 of the connectors 110 and 210 are, for example, D+ pins of the USB connectors, and the second terminals 112 and 212 of the connectors 110 and 210 are, for example, D− pins of the USB connectors. In other words, in an embodiment, the adapter 100 has a USB interface, and the portable electronic device 200 can perform data transmission through the USB interface and can be charged and supplied with power through the USB interface.

In view of a charge control, the charger 220 of the portable electronic device 200 transmits a control signal through the connector 210 to indicate whether to enter a quick charge mode. Moreover, the controller 110 of the adapter 100 determines whether to enter the quick charge mode according to the control signal from the connector 110.

For example, the charge control circuit 221 of the portable electronic device 200 can transmit the control signal to the adapter 100 through the first terminal 211 or the second terminal 212. Moreover, the determination circuit 121 of the adapter 100 detects the first terminal 111 or the second terminal 112 to obtain the control signal from the portable electronic device 200. Furthermore, the determination circuit 121 determines whether the control signal is greater than a predetermined value, and accordingly generates a determination result. The charge control circuit 122 determines whether to enter the quick charge mode according to the determination result. In the present embodiment, the above predetermined value is a reference voltage. In other embodiments, the predetermined value can be a reference current or other comparison reference value, but the invention is not limited thereto.

For example, when the control signal is greater than the predetermined value for a predetermined time, the adapter 100 enters the quick charge mode. Moreover, when the control signal is smaller than the predetermined value, the adapter 100 enters a normal charge mode. In the normal charge mode, the power converter 130 converts an external alternating current (AC) voltage into a direct current (DC) voltage, and the adapter 100 transmits the DC voltage generated by the power converter 130 to the power terminal 113. Moreover, the battery charge circuit 222 of the portable electronic device 200 receives the DC voltage from the adapter 100 through the power terminal 213, and uses the DC voltage to charge the battery pack 240 or supplies power to the system circuit 230.

On the other hand, in the quick charge mode, the charge control circuit 221 of the portable electronic device 200 generates a charge control signal, and transmits the charge control signal to the adapter 100 through the first terminal 211. Moreover, the charge control circuit 122 of the adapter 100 receives the charge control signal from the first terminal 111.

In an embodiment, the charge control signal transmitted by the portable electronic device 200 may include a plurality of pulses (or a waveform signal such as a square wave, etc.), and encoding information is formed by the plurality of pulses. For example, widths of the plurality of pulses have a proportional relationship, and the encoding information is generated according to the proportional relationship between the widths of the pulses. Moreover, the encoding information can be used to indicate a quick charge voltage.

For example, when the adapter 100 receives the charge control signal, the charge control circuit 122 encodes width proportions of the pulses to generate the encoding information. Moreover, the power converter 130 adjusts a level of the DC voltage according to the encoding information, so as to generate the quick charge voltage, and the power converter 130 transmits the quick charge voltage through the power terminal 113. On the other hand, the battery charge circuit 222 of the portable electronic device 200 receives the quick charge voltage from the adaptor 100 through the power terminal 213 of the connector 210, and uses the quick charge voltage to charge the battery pack 240.

More specifically, the quick charge voltage received by the portable electronic device 200 in the quick charge mode is higher than the DC voltage received in the normal charge mode, so that the portable electronic device 200 can implement quick charging by using the quick charge voltage. For example, in the normal charge mode, the DC voltage generated by the power converter 130 is, for example, 5V. On the other hand, in the quick charge mode, the power adapter 130 increases the level of the DC voltage according to the encoding information to generate the quick charge voltage with 9V, 12V, or 20V.

In an embodiment, the adapter 100 is complied with specification of a dedicated charging port (DCP). Therefore, in view of the switch 123 of the adapter 100, in an initial state, the switch 123 is turned on to short the first terminal 111 and the second terminal 112 of the connector 110. In this way, when the adapter 100 is electrically connect the portable electronic device 200, the charge control circuit 221 of the portable electronic device 200 detects that the first terminal 211 and the second terminal 212 have a same voltage level, and determines that the adapter 100 has the DCP.

In view of charge control, the portable electronic device 200 transmits the control signal to make the adapter 100 to enter the quick charge mode or the normal charge mode. Moreover, in the quick charge mode, the portable electronic device 200 further transmits the charge control signal to make the adapter 100 to provide the quick charge voltage. Besides, in the quick charge mode, the adapter 100 turns off the switch 123 through the charge control circuit 122 to disconnect the first terminal 111 and the second terminal 112. In this way, the controller 120 of the adapter 100 can receive the chare control signal from the portable electronic device 200 through the first terminal 111. Moreover, the controller 120 controls the power converter 130 according to the charge control signal to make the power converter 130 to produce the quick charge voltage.

It should be noticed that the portable electronic device 200 communicates with the adapter through the charge control signal transmitted by a single data line, so as to make the adapter 100 to generate the corresponding quick charge voltage. However, in the existing technique, two data lines (for example, the first terminal 111 and the second terminal 112) have to be used to transmit two voltage signals in order to implement control of the quick charge voltage. Therefore, compared to the existing technique, the embodiment of FIG. 1 can reduce the design cost and design complexity of the adapter 100 and the portable electronic device 200.

FIG. 2 is a schematic diagram of a charge control circuit in the adapter according to an embodiment of the invention. Referring to FIG. 2, the charge control circuit 122 of the adapter 100 includes a calculation unit 20 and an encoding unit 22. The calculation unit 20 is electrically connected to the first terminal 111 of the connector 110, and the encoding unit 22 is electrically connected to the calculation unit 20. In view of operation, the calculation unit 20 receives a charge control signal S2 from the first terminal 111. Moreover, the calculation unit 20 calculates widths of the plurality of pulses in the charge control signal S2 to generate at least one proportion value. Moreover, the encoding unit 22 encodes the at least one proportion value to generate the encoding information.

For example, FIG. 3 is a schematic diagram of the charge control signal according to an embodiment of the invention. Referring to FIG. 3, the charge control signal S2 includes a plurality of pulses P31-P34. In an embodiment, the calculation unit 20 respectively calculates a width of the pulse P31 and a width of the pulse P32 to generate width values W31 and W32. Moreover, the calculation unit 20 divides the width value W32 by the width value W31 to obtain a proportion value, i.e. W32/W31. In addition, the encoding unit 22 encodes the proportion value W32/W31 to generate the encoding information.

In another embodiment, the calculation unit 20 respectively calculates widths of the pulses P31-P34 to generate width values W31-W34. Moreover, the calculation unit 20 respectively divides the width values W32-W34 by the width value W31 to obtain a plurality of proportion values, i.e. W32/W31, W33/W31 and W34/W31. Then, the encoding unit 22 encodes the above proportion values to generate the encoding information.

In another embodiment, the calculation unit 20 respectively calculates widths of the pulses P31-P34 to generate width values W31-W34. Moreover, the calculation unit 20 calculates width proportions between any two adjacent pulses in the pulses P31-P34 sequentially, so as to generate a plurality of proportion values, i.e. W32/W31, W33/W32 and W34/W33. Then, the encoding unit 22 encodes the above proportion values to generate the encoding information.

Figure 4:
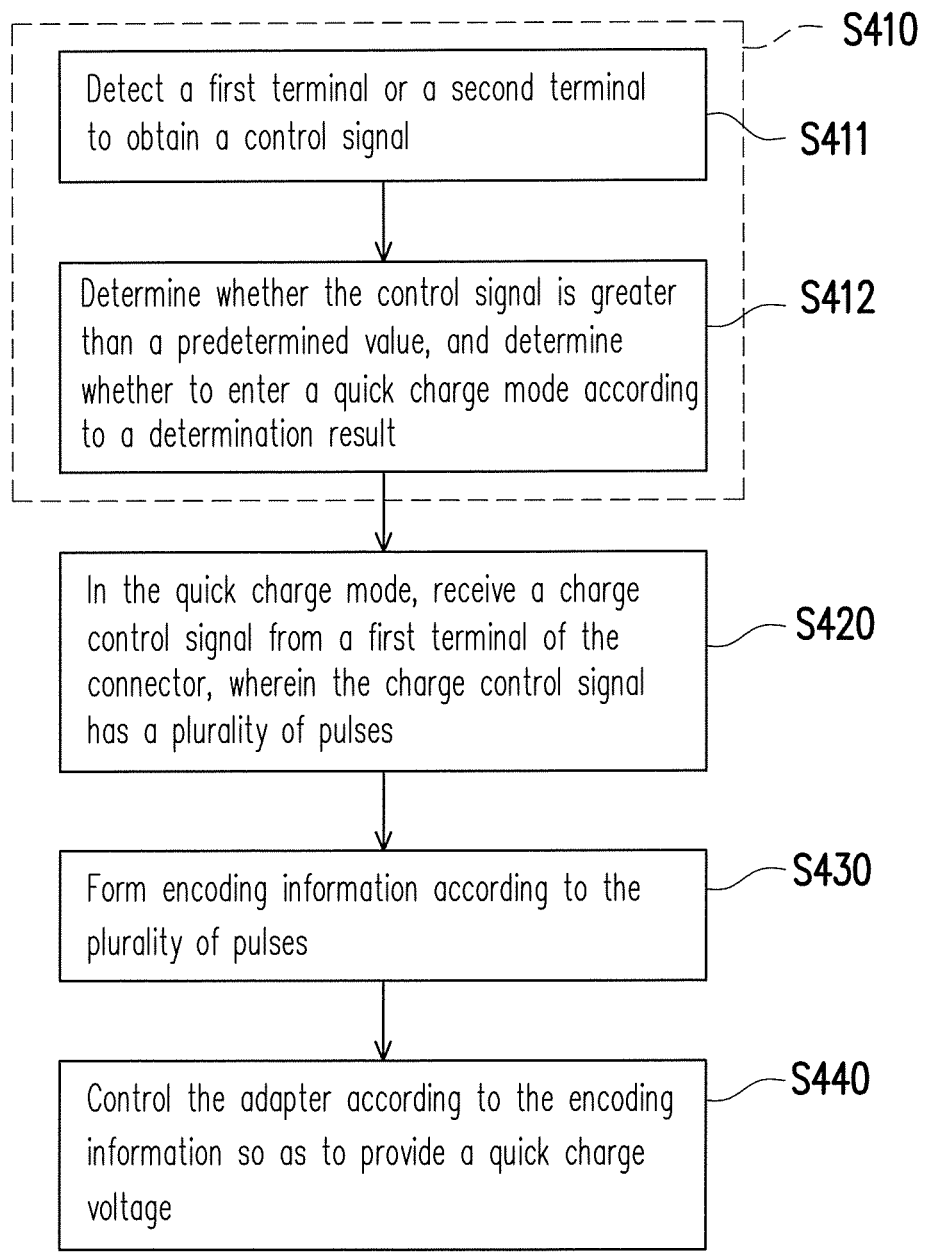
FIG. 4 is a flowchart illustrating a charge control method of an adapter according to an embodiment of the invention.

According to another aspect, FIG. 4 is a flowchart illustrating a charge control method of an adapter according to an embodiment of the invention. Referring to FIG. 1 and FIG. 4 for the operation of the adapter. In the beginning, the switch 123 of the adapter 100 is turned on to short the first terminal 111 and the second terminal 112 of the connector 110. Moreover, in step S410, the adapter 100 receives the control signal from the connector 110 to determine whether to enter the quick charge mode. For example, in step S411, the adapter 100 detects the first terminal 111 or the second terminal 112 to obtain the control signal. Moreover in step S412, the adapter 100 determines whether the control signal is greater than a predetermined value, and determines whether to enter the quick charge mode according to a determination result.

In the quick charge mode, the adapter 100 turns off the switch 123 to disconnect the first terminal 111 and the second terminal 112. Moreover, in step S420, the adapter 100 receives the charge control signal from the first terminal 111. The charge control signal includes a plurality of pulses. Moreover, in step S430, the adapter 100 generates the encoding information according to the plurality of the pulses. For example, the adapter 100 can encode the width proportions of the plurality of pulses to generate the encoding information. In step S440, the power converter 130 of the adapter 100 is controlled by the encoding information to provide the corresponding quick charge voltage.

It should be noticed that the charge control signal can be transmitted through a single data line (for example, the first terminal 111). Moreover, the adapter 100 can receive the charge control signal by using a single data line, which avails reducing the design cost and the design complexity of the adapter 100.

Besides, different types of proportion values can be produced according to the widths of the pulses, and the adapter 100 can generate the encoding information by using at least one proportion value. Therefore, the method for generating the encoding information described in the step S430 includes a plurality of implementations. For example, FIG. 5A to FIG. 5C are flowcharts illustrating details of the step S430 according to an embodiment of the invention, and the embodiment of FIG. 5A to FIG. 5C are described below with reference of the charge control signal S2 in FIG. 3.

Figure 5A:
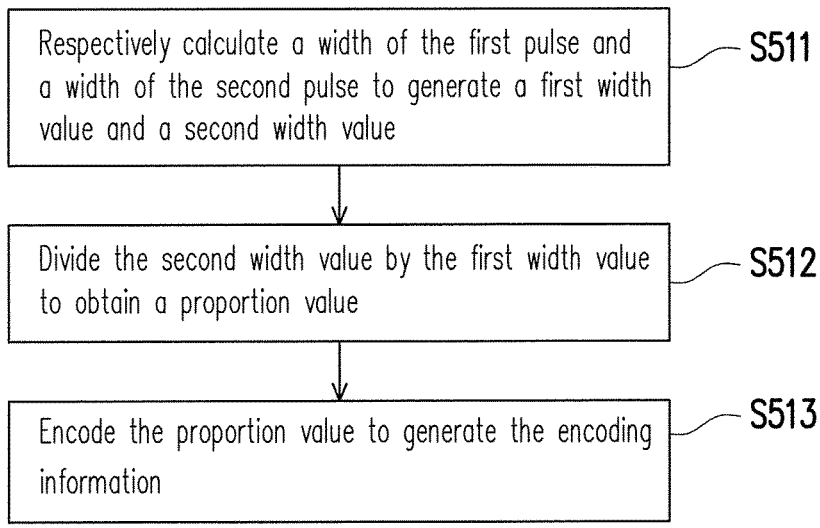
FIG. 5A to FIG. 5C are flowcharts illustrating details of the step S430 according to an embodiment of the invention.

Referring to FIG. 5A and FIG. 3, in an embodiment, as shown in step S511, the adapter 100 respectively calculates a width of a first pulse (for example, the pulse P31) and a width of a second pulse (for example, the pulse P32) to generate a first width value W31 and a second width value W32. Moreover, as shown in step S512, the adapter 100 divides the second width value W32 by the first width value W32 to obtain a proportion value, i.e. W32/W31. Furthermore, as shown in step S513, the adapter 100 encodes the proportion value W32/W31 to generate the encoding information.

Figure 5B:
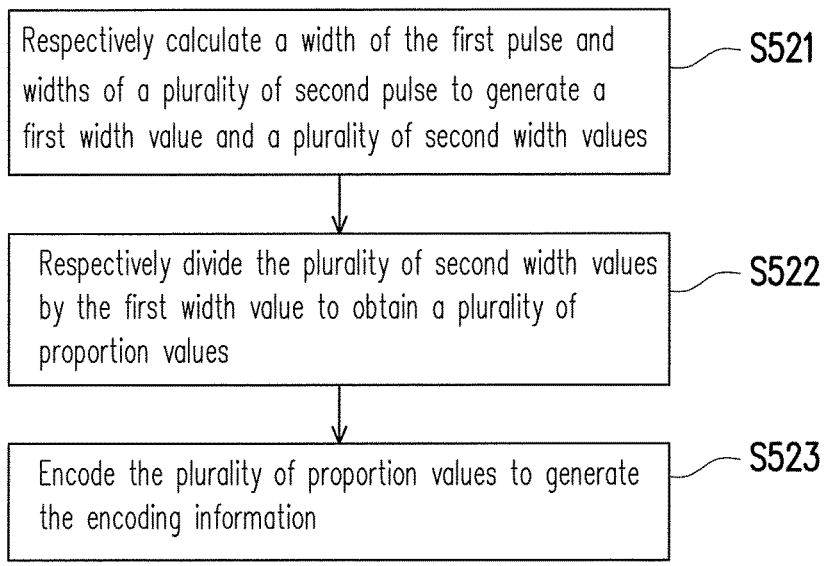

Referring to FIG. 5B and FIG. 3, in another embodiment, as shown in step S521, the adapter 100 respectively calculates a width of a first pulse (for example, the pulse P31) and widths of a plurality of second pulses (for example, the pulses P32-P34) to generate the first width value W31 and a plurality of second width values W32-W34. Moreover, in step S522, the adapter 100 respectively divides the second width values W32-W34 by the first width value W31 to obtain a plurality of proportion values W32/W31, W33/W31 and W34/W31. Furthermore, as shown in step S523, the adapter 100 encodes the above proportion values W32/W31, W33/W31 and W34/W31 to generate the encoding information.

Figure 5C:
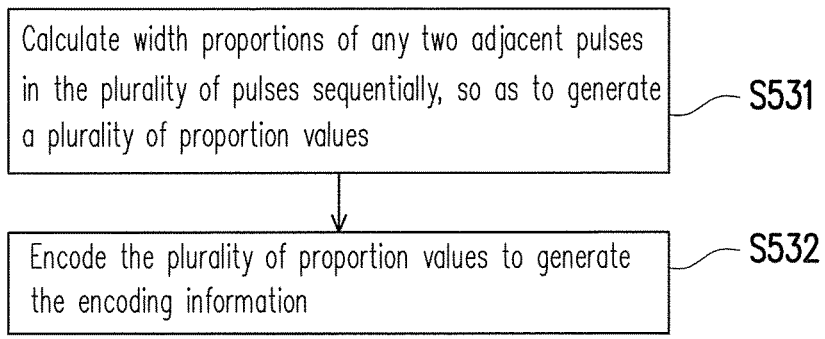

Referring to FIG. 5C and FIG. 3, in another embodiment, as shown in step S531, the adapter 100 calculates width proportions between any two adjacent pulses in a plurality of pulses (for example, the pulses P31-P34) sequentially, so as to generate a plurality of proportion values, i.e. W32/W31, W33/W32 and W34/W33. Furthermore, as shown in step S532, the adapter 100 encodes the above proportion values W32/W31, W33/W32 and W34/W33 to generate the encoding information.

Figure 6:
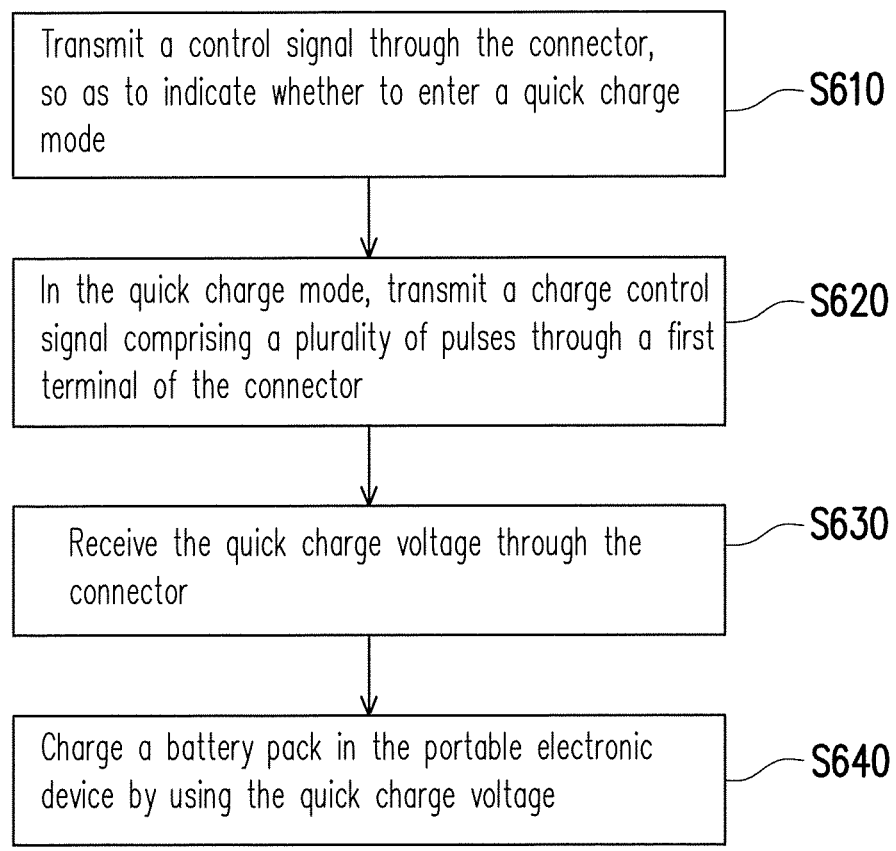
FIG. 6 is a flowchart illustrating a charge control method of a portable electronic device according to an embodiment of the invention.

According to another aspect, FIG. 6 is a flowchart illustrating a charge control method of the portable electronic device according to an embodiment of the invention. Referring to FIG. 1 and FIG. 6 for the operation of the portable electronic device. In view of charge control, the portable electronic device 200 can detect the voltages of the first terminal 211 and the second terminal 212 to determine the type of the adapter 100.

Moreover, as shown in step S610, the portable electronic device 200 transmits the control signal through the connector 210 to indicate whether to enter the quick charge mode, wherein the portable electronic device 200 can transmit the control signal through the first terminal 211 or the second terminal 212 of the connector 210. Moreover, as shown in step S620, in the quick charge mode, the portable electronic device 200 transmits the charge control signal through the first terminal 211 to make the adapter 100 to generate the quick charge voltage. In addition, as shown in step S630, the portable electronic device 200 receives the quick charge voltage through the power terminal 213 of the connector 210. Therefore, as shown in step S640, the portable electronic device 200 uses the quick charge voltage to charge the battery pack 240.

It should be noticed that the charge control signal generated by the portable electronic device 200 includes a plurality of pulses, and the plurality of pulses have a proportion relationship. Moreover, the encoding information can be generated according to the proportion relationship, and the encoding information is used for indicating the required quick charge voltage. In addition, the charge control signal generated by the portable electronic device 200 can be transmitted through a single data line (for example, the first terminal 211). Therefore, the design cost and design complexity of the portable electronic device 200 can be reduced.

Further, the proportion relationship corresponds to at least one proportion value, and the encoding information can be generated by encoding the at least one proportion value. For example, taking the charge control signal of FIG. 3 as an example, the charge control signal S2 includes a plurality of pulses P31-P34, and widths of the pulses P31-P34 respectively correspond to width values W31-W34. In an embodiment, the at least one proportion value can be defined by a width of a first pulse (for example, the pulse P31) and a width of a second pulse (for example, the pulse P32), i.e. the at least one proportion ration is, for example, W32/W31.

In another embodiment, the at least one proportion value includes a plurality of proportion values, and the plurality of proportion values are, for example, width proportions between a plurality of second pulses (for example, the pulses P32-P34) and the first pulse (for example, the pulse P31), i.e. the proportion values are, for example, W32/W31, W33/W31 and W34/W31. Moreover, in another embodiment, the at least one proportion value includes a plurality of proportion values, and the plurality of proportion values are, for example, width proportions between any two adjacent pulses in a plurality of pulses (for example, the pulses P31-P34). Namely, the plurality of proportion values are, for example, W32/W31, W33/W32 and W34/W33.

In summary, the portable electronic device of the invention can communicate with the adapter through the charge control signal transmitted through a single data line, so as to make the adapter to generate the corresponding quick charge voltage. In other words, the portable electronic device and the adapter can achieve control of the quick charge voltage through the charge control signal transmitted through the single data line. Therefore, compared to the existing technique, the technique of the invention avails reducing design cost and design complexity of the adapter and the portable electronic device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. An adapter, comprising:
a connector, comprising a plurality of pins; and
a controller, electrically connected to the connector, and configured to:
receive a first control signal from a first pin which is one of the plurality of pins, wherein the first control signal indicates whether to enter a quick charge mode or to enter a normal charge mode;
in response to the first control signal indicating to enter the quick charge mode, receive a second control signal which has a plurality of pulses from the first pin, wherein the second control signal is different from the first control signal;
generate encoding information according to a pulse width proportion of at least two adjacent pulses of the plurality of pulses;
determine a quick charge voltage according to the encoding information;
control the adapter to provide the quick charge voltage which has been determined; and in response to the first control signal indicating to enter the normal charge mode, control the adapter to provide a DC voltage which is lower than the quick charge voltage.

2. The adapter as claimed in claim 1, wherein the plurality of pins of the connector further comprises a second pin, and the controller comprises:
a determination circuit, detecting the first pin or the second pin to obtain the first control signal, and determining whether the first control signal is greater than a predetermined value to generate a determination result; and
a charge control circuit, electrically connected to the determination circuit and the first pin, and determining whether to enter the quick charge mode or the normal charge mode according to the determination result, wherein in response to the quick charge mode is determined to be entered, the charge control circuit encodes width proportions of the plurality of pulses to generate the encoding information.

3. The adapter as claimed in claim 2, wherein the controller further comprises:
a switch, electrically connected between the first pin and the second pin, and controlled by the charge control circuit.

4. The adapter as claimed in claim 2, wherein the plurality of pulses comprises a first pulse and a second pulse adjacent to each other, and the charge control circuit comprises:
a calculation unit, electrically connected to the first pin, respectively calculating a width of the first pulse and a width of the second pulse to generate a first width value and a second width value, and dividing the second width value by the first width value to obtain a proportion value; and
an encoding unit, electrically connected to the calculation unit, and encoding the proportion value to generate the encoding information.

5. The adapter as claimed in claim 2, wherein the charge control circuit comprises:
a calculation unit, electrically connected to the first pin, and calculating width proportions of any two adjacent pulses of the plurality of pulses sequentially, so as to generate a plurality of proportion values; and
an encoding unit, electrically connected to the calculation unit, and encoding the proportion values to generate the encoding information.

6. The adapter as claimed in claim 1, further comprising:
a power converter, electrically connected to the connector and the controller, converting an alternating current voltage into a direct current voltage, and adjusting a level of the direct current voltage according to the encoding information to generate the quick charge voltage.

7. A charge control method of an adapter, wherein the adapter comprises a connector comprising a plurality of pins, the charge control method of the adapter comprising:
receiving a first control signal from a first pin which is one of the plurality of pins, wherein the first control signal indicates whether to enter a quick charge mode or to enter a normal charge mode;
in response to the first control signal indicating to enter the quick charge mode, receiving a second control signal which has a plurality of pulses from the first pin, wherein the second control signal is different from the first control signal;
generating encoding information according to a pulse width proportion of at least two adjacent pulses of the plurality of pulses;
determining a quick charge voltage according to the encoding information;
controlling the adapter to provide the quick charge voltage which has been determined; and
in response to the first control signal indicating to enter the normal charge mode, control the adapter to provide a DC voltage which is lower than the quick charge voltage.

8. The charge control method of the adapter as claimed in claim 7, wherein the plurality of pins of the connector further comprises a second pin, and the charge control method of the adapter further comprises:
detecting the first pin or the second pin to obtain the first control signal; and
determining whether the first control signal is greater than a predetermined value, and determining whether to enter the quick charge mode or the normal charge mode according to a determination result.

9. The charge control method of the adapter as claimed in claim 7, wherein the plurality of pulses comprises a first pulse and a second pulse adjacent to each other, and the step of generating the encoding information according to the pulse width proportion of at least two adjacent pulses of the plurality of pulses comprises:
respectively calculating a width of the first pulse and a width of the second pulse to generate a first width value and a second width value;
dividing the second width value by the first width value to obtain a proportion value; and
encoding the proportion value to generate the encoding information.

10. The charge control method of the adapter as claimed in claim 7, wherein the step of generating the encoding information according to the pulse width proportion of at least two adjacent pulses of the plurality of pulses comprises:
calculating width proportions of any two adjacent pulses of the plurality of pulses sequentially, so as to generate a plurality of proportion values; and
encoding the proportion values to generate the encoding information.

11. A portable electronic device, comprising:
a connector, comprising a plurality of pins; and
a charger, electrically connected to the connector, and configured to:
transmit a first control signal through a first pin which is one of the plurality of pins, wherein the first control signal indicates whether to enter a quick charge mode or a normal charge mode; and
in response to the first control signal indicating to enter the quick charge mode, transmit a second control signal which has a plurality of pulses through the first pin,
wherein widths of the plurality of pulses have a proportional relationship with encoding information which is used for indicating a quick charge voltage, wherein the first control signal is different from the second control signal.

12. The portable electronic device as claimed in claim 11, wherein the plurality of pins of the connector further comprises a second pin, and the charger comprises:
a charge control circuit, transmitting the first control signal through the first pin or the second pin, wherein in response to the first control signal indicating to enter the quick charge mode, the charge control circuit generates the second control signal, and transmits the second control signal through the first pin; and a battery charge circuit, electrically connected to the connector, receiving the quick charge voltage through the connector, and charging a battery pack by using the quick charge voltage.

13. The portable electronic device as claimed in claim 11, wherein the proportion relationship corresponds to at least one proportion value, and the encoding information is generated by encoding the at least one proportion value.

14. The portable electronic device as claimed in claim 13, wherein the plurality of pulses comprises a first pulse and a second pulse adjacent to each other, and the at least one proportion value is defined by a width of the first pulse and a width of the second pulse.

15. The portable electronic device as claimed in claim 13, wherein the at least one proportion value comprises a plurality of proportion values, the plurality of pulses comprises a first pulse and a plurality of second pulses, and the proportion values are width proportions between the second pulses and the first pulse.

16. The portable electronic device as claimed in claim 13, wherein the at least one proportion value comprises a plurality of proportion values, and the proportion values are width proportions between any two adjacent pulses in the plurality of pulses.

17. A charge control method of a portable electronic device, wherein the portable electronic device comprises a connector comprising a plurality of pins, the charge control method of the portable electronic device comprising:

transmitting a first control signal through a first pin which is one of the plurality of pins, wherein the first control signal indicates whether to enter a quick charge mode or a normal charge mode; and in response to the first control signal indicating to enter the quick charge mode, transmitting a second control signal which has a plurality of pulses through the first pin, wherein widths of the plurality of pulses have a proportional relationship with encoding information which is used for indicating a quick charge voltage, wherein the first control signal is different from the second control signal.

18. The charge control method of the portable electronic device as claimed in claim 17, wherein the plurality of pins of the connector further comprises a second pin, and the step of transmitting the first control signal through the first pin comprises:

transmitting the first control signal through the first pin or the second pin.

19. The charge control method of the portable electronic device as claimed in claim 17, further comprising:

receiving the quick charge voltage through the connector; and charging a battery pack in the portable electronic device by using the quick charge voltage.

20. The charge control method of the portable electronic device as claimed in claim 17, wherein the proportion relationship corresponds to at least one proportion value, and the encoding information is generated by encoding the at least one proportion value.

21. The charge control method of the portable electronic device as claimed in claim 20, wherein the plurality of pulses comprises a first pulse and a second pulse adjacent to each other, and the at least one proportion value is defined by a width of the first pulse and a width of the second pulse.

22. The charge control method of the portable electronic device as claimed in claim 20, wherein the at least one proportion value comprises a plurality of proportion values, the plurality of pulses comprises a first pulse and a plurality of second pulses, and the proportion values are width proportions between the second pulses and the first pulse.

23. The charge control method of the portable electronic device as claimed in claim 20, wherein the at least one proportion value a plurality of proportion values, and the proportion values are width proportions between any two adjacent pulses in the plurality of pulses.

* * * * *